(12) United States Patent
Rubin et al.

(10) Patent No.: US 10,821,653 B2
(45) Date of Patent: Nov. 3, 2020

(54) CONTINUOUS MOLDING OF THERMOPLASTIC LAMINATES

(76) Inventors: Alexander M. Rubin, St. Louis, MO (US); James R. Fox, Forissant, MO (US); Randall D. Wilkerson, O'Fallon, MO (US)

( * ) Notice: Subject to any disclaimer, the term of this patent is extended or adjusted under 35 U.S.C. 154(b) by 345 days.

(21) Appl. No.: 12/711,401

(22) Filed: Feb. 24, 2010

(65) Prior Publication Data

US 2011/0206906 A1 Aug. 25, 2011

(51) Int. Cl.
*B29C 53/04* (2006.01)
*B29L 31/00* (2006.01)

(52) U.S. Cl.
CPC ......... *B29C 53/04* (2013.01); *B29L 2031/003* (2013.01); *Y10T 156/1007* (2015.01); *Y10T 156/1013* (2015.01); *Y10T 428/24* (2015.01); *Y10T 428/24744* (2015.01)

(58) Field of Classification Search
CPC ............... B29C 53/04; Y10T 156/1007; Y10T 156/1008; Y10T 156/1013
USPC ........ 156/200, 202, 203, 217, 201, 218, 222
See application file for complete search history.

(56) References Cited

U.S. PATENT DOCUMENTS

| | | | |
|---|---|---|---|
| 2,440,228 A | 4/1948 | Yardeny et al. | |
| 2,708,288 A | 5/1955 | Fuller et al. | |
| 4,061,817 A | 12/1977 | Maxel | |
| 4,103,470 A | 8/1978 | Cook | |
| 4,151,031 A | 4/1979 | Goad et al. | |
| 4,225,553 A | 9/1980 | Hirota et al. | |
| 4,414,266 A | 11/1983 | Archer et al. | |
| 4,414,269 A * | 11/1983 | Lubowitz et al. | ............ 442/128 |
| 4,462,946 A | 7/1984 | Goldsworthy | |
| 4,571,355 A | 2/1986 | Elrod | |
| 4,608,220 A | 8/1986 | Caldwell et al. | |
| 4,614,013 A | 9/1986 | Stevenson | |
| 4,674,712 A | 6/1987 | Whitener et al. | |
| 4,749,613 A | 6/1988 | Yamada et al. | |
| 4,759,815 A * | 7/1988 | Frey | .............................. 156/222 |
| 4,818,460 A | 4/1989 | Nied | |
| 4,859,267 A | 8/1989 | Knoll | |
| 4,913,910 A * | 4/1990 | McCarville et al. | ......... 425/336 |
| 4,944,824 A | 7/1990 | Gupta | |
| 4,970,044 A | 11/1990 | Kim et al. | |
| 5,021,283 A | 6/1991 | Takenaka et al. | |

(Continued)

FOREIGN PATENT DOCUMENTS

BE 834458 2/1976
DE 1504302 A1 4/1969

(Continued)

OTHER PUBLICATIONS

Peters, S.T., Handbook of Composites, Second Edition, 1998, pp. 576-577.*

(Continued)

*Primary Examiner* — Alex B Efta
(74) *Attorney, Agent, or Firm* — Yee & Associates, P.C.

(57) ABSTRACT

An elongate thermoplastic composite member is fabricated by a continuous molding process. A pre-consolidated thermoplastic laminate is softened by heating it to a temperature below its melting layup, and is fed substantially continuously through multiple sets of tool dies. The tool dies incrementally mold portions of softened laminate over a mandrel to form the laminate into a shape having a closed cross section.

21 Claims, 6 Drawing Sheets

(56) References Cited

U.S. PATENT DOCUMENTS

| | | |
|---|---|---|
| 5,026,447 A | 6/1991 | O'Connor |
| 5,026,514 A | 6/1991 | Hauwiller et al. |
| 5,043,128 A | 8/1991 | Umeda |
| 5,057,175 A | 10/1991 | Ashton |
| 5,064,439 A | 11/1991 | Chang et al. |
| 5,139,407 A | 8/1992 | Kim et al. |
| 5,182,060 A | 1/1993 | Berecz |
| 5,192,330 A | 3/1993 | Chang et al. |
| 5,192,383 A | 3/1993 | Cavin |
| 5,320,700 A | 6/1994 | Hall et al. |
| 5,413,472 A | 5/1995 | Dietterich et al. |
| 5,681,513 A | 10/1997 | Farley |
| 5,716,487 A | 2/1998 | Sumerak |
| 5,759,325 A | 6/1998 | Davis |
| 5,820,804 A | 10/1998 | Elmaleh |
| 5,958,550 A | 9/1999 | Childress |
| 6,007,917 A | 12/1999 | Weigel et al. |
| 6,024,555 A | 2/2000 | Goodridge et al. |
| 6,162,314 A | 12/2000 | Kassuelke et al. |
| 6,291,049 B1 | 9/2001 | Kunkel et al. |
| 6,319,346 B1 | 11/2001 | Clark et al. |
| 6,425,969 B1 | 7/2002 | van den Akker |
| 6,592,795 B2 * | 7/2003 | Kasai et al. ............... 264/241 |
| 6,689,448 B2 | 2/2004 | George et al. |
| 6,696,009 B2 | 2/2004 | Davis |
| 6,764,057 B2 | 7/2004 | Fanucci et al. |
| 6,869,558 B2 | 3/2005 | Polk, Jr. et al. |
| 7,186,361 B2 | 3/2007 | Kasai et al. |
| 7,191,982 B2 | 3/2007 | Vetillard et al. |
| 7,300,693 B2 | 11/2007 | Albers et al. |
| 7,419,372 B2 | 9/2008 | Kasai et al. |
| 7,431,875 B2 | 10/2008 | Rule |
| 7,513,769 B2 | 4/2009 | Benson et al. |
| 7,670,525 B2 | 3/2010 | Weidmann et al. |
| 7,807,005 B2 | 10/2010 | Rubin et al. |
| 7,871,553 B2 | 1/2011 | Wilkerson et al. |
| 8,151,529 B2 | 4/2012 | Weidmann et al. |
| 8,163,221 B2 | 4/2012 | Suzuki et al. |
| 2002/0088549 A1 | 7/2002 | Fanucci et al. |
| 2002/0135093 A1 | 9/2002 | Davis |
| 2003/0044570 A1 | 3/2003 | George et al. |
| 2003/0168555 A1 | 9/2003 | Livi et al. |
| 2003/0175520 A1 | 9/2003 | Grutta et al. |
| 2003/0232176 A1 | 12/2003 | Polk, Jr. et al. |
| 2004/0009338 A1 | 1/2004 | Jo et al. |
| 2004/0096535 A1 | 5/2004 | Hudecek et al. |
| 2005/0029707 A1 | 2/2005 | Kasai et al. |
| 2005/0053765 A1 | 3/2005 | Albers et al. |
| 2005/0056362 A1 | 3/2005 | Benson et al. |
| 2005/0252603 A1 | 11/2005 | Rule |
| 2006/0011289 A1 | 1/2006 | Suriano |
| 2006/0083806 A1 | 4/2006 | Kasai et al. |
| 2006/0216480 A1 | 9/2006 | Weidmann et al. |
| 2006/0226288 A1 | 10/2006 | Vetillard et al. |
| 2006/0249868 A1 | 11/2006 | Brown et al. |
| 2007/0012858 A1 | 1/2007 | Callis |
| 2007/0175571 A1 | 8/2007 | Rubin et al. |
| 2007/0175573 A1 | 8/2007 | Fox et al. |
| 2007/0175575 A1 | 8/2007 | Rubin et al. |
| 2008/0168619 A1 | 7/2008 | Gonzalez et al. |
| 2008/0185756 A1 | 8/2008 | Wilkerson et al. |
| 2008/0277058 A1 | 11/2008 | Schmier, II et al. |
| 2009/0065977 A1 | 3/2009 | Suzuki et al. |
| 2009/0074905 A1 | 3/2009 | Matsen et al. |
| 2009/0078362 A1 | 3/2009 | Wilkerson et al. |
| 2010/0148005 A1 | 6/2010 | Weidmann et al. |
| 2010/0225016 A1 | 9/2010 | Prebil et al. |
| 2010/0319841 A1 | 12/2010 | Rubin et al. |
| 2012/0175049 A1 | 7/2012 | Suzuki et al. |
| 2013/0202871 A1 | 8/2013 | Hidaka et al. |

FOREIGN PATENT DOCUMENTS

| | | | |
|---|---|---|---|
| DE | 1629830 A1 | 1/1971 | |
| DE | 2165470 A1 | 7/1973 | |
| DE | 2647821 A1 | 4/1978 | |
| DE | 3709480 A1 | 10/1988 | |
| DE | 4017978 A1 | 12/1991 | |
| DE | 29711917 U1 | 8/1997 | |
| EP | 0024895 A2 | 3/1981 | |
| EP | 0277727 A1 | 8/1988 | |
| EP | 0317861 A2 | 5/1989 | |
| EP | 1336469 A1 | 8/2003 | |
| EP | 1504880 A1 | 2/2005 | |
| EP | 1614624 A1 | 1/2006 | |
| EP | 1666353 A1 | 6/2006 | |
| EP | 1813404 A2 | 8/2007 | |
| EP | 1995040 A1 * | 11/2008 | |
| EP | 2014448 A2 | 1/2009 | |
| FR | 2384604 A1 * | 10/1978 | ............ B29C 53/04 |
| FR | 2587649 A1 | 3/1987 | |
| FR | 2888155 A1 | 1/2007 | |
| GB | 531357 | 1/1941 | |
| GB | 1157239 | 7/1969 | |
| JP | 2007001298 A | 1/2007 | |
| WO | 8302085 A1 | 6/1983 | |
| WO | 2007092371 A2 | 8/2007 | |
| WO | 2008073164 A2 | 6/2008 | |
| WO | 2008094227 A1 | 8/2008 | |
| WO | 2008097847 A1 | 8/2008 | |
| WO | 8810186 A1 | 12/2008 | |
| WO | 2010101744 A2 | 9/2010 | |
| WO | 2011106117 A1 | 9/2011 | |

OTHER PUBLICATIONS

International Search Report dated Oct. 23, 2007, regarding Application No. PCT/US2007/003021 (WO2007092371), 3 pages.
International Search Report dated Oct. 27, 2008, regarding Application No. PCT/US2007/018611 (WO2008073164), 3 pages.
International Search Report dated Mar. 31, 2008, regarding Application No. PCT/US2007/022234 (WO2008094227), 3 pages.
International Search Report dated Jul. 17, 2008, regarding Application No. PCT/US2008/052806 (WO2008097847), 2 pages.
International Search Report dated Oct. 28, 2010, regarding Application No. PCT/US2010/025176 (WO2010101744), 5 pages.
International Search Report dated Apr. 28, 2011, regarding Application No. PCT/US2011/022003 (WO2011106117), 3 pages.
Loos et al., "Thermoplastic Composite Sheet Forming," presented at National Science Foundation Workshop on Composite Sheet Forming, Sep. 5-7, 2001, Lowell, MA. Accessed Apr. 4, 2012, http://www.mech.northwestern.edu/fac/cao/nsfworkshop/presentations/ns7_loos.pdf, 11 pages.
Prebil et al., U.S. Appl. No. 13/419,187, filed Mar. 13, 2012, 67 pages.
Preliminary Amendment, dated Aug. 1, 2008, regarding U.S. Appl. No. 11/347,122, 39 pages.
USPTO Office Action, dated Mar. 12, 2009, regarding U.S. Appl. No. 11/347,122, 16 pages.
USPTO Final Office Action, dated Jul. 9, 2009, regarding U.S. Appl. No. 11/347,122, 8 pages.
USPTO Office Action, dated Nov. 23, 2009, regarding U.S. Appl. No. 11/347,122, 9 pages.
USPTO Final Office Action, dated Jun. 24, 2010, regarding U.S. Appl. No. 11/347,122, 12 pages.
USPTO Notice of Allowance, dated Jul. 21, 2010, regarding U.S. Appl. No. 11/347,122, 6 pages.
USPTO Office Action, dated Feb. 4, 2010, regarding U.S. Appl. No. 11/584,923, 16 pages.
USPTO Final Office Action, dated Jul. 13, 2010, regarding U.S. Appl. No. 11/584,923, 12 pages.
USPTO Office Action, dated Jul. 27, 2011, regarding U.S. Appl. No. 11/584,923, 10 pages.
USPTO Office Action, dated Apr. 15, 2010, regarding U.S. Appl. No. 11/697,378, 28 pages.
USPTO Final Office Action, dated Oct. 27, 2010, regarding U.S. Appl. No. 11/697,378, 20 pages.
USPTO Office Action, dated Jul. 27, 2011, regarding U.S. Appl. No. 11/697,378, 19 pages.

(56) References Cited

OTHER PUBLICATIONS

USPTO Final Office Action, dated Mar. 2, 2012, regarding U.S. Appl. No. 11/697,378, 6 pages.
USPTO Office Action, dated Feb. 2, 2010, regarding U.S. Appl. No. 11/699,653, 15 pages.
USPTO Final Office Action, dated Jul. 16, 2010, regarding U.S. Appl. No. 11/699,653, 10 pages.
USPTO Office Action, dated Feb. 16, 2011, regarding U.S. Appl. No. 11/699,653, 12 pages.
USPTO Final Office Action, dated Jul. 7, 2011, regarding U.S. Appl. No. 11/699,653, 14 pages.
USPTO Office Action, dated Oct. 1, 2009, regarding U.S. Appl. No. 11/701,789, 17 pages.
USPTO Final Office Action, dated Mar. 25, 2010, regarding U.S. Appl. No. 11/701,789, 15 pages.
USPTO Office Action, dated Jun. 21, 2010, regarding U.S. Appl. No. 11/701,789, 11 pages.
USPTO Final Office Action, dated Dec. 29, 2010, regarding U.S. Appl. No. 11/701,789, 14 pages.
USPTO Office Action, dated Apr. 20, 2011, regarding U.S. Appl. No. 11/701,789, 15 pages.
USPTO Final Office Action, dated Oct. 12, 2011, regarding U.S. Appl. No. 11/701,789, 17 pages.
USPTO Office Action, dated Sep. 11, 2009, regarding U.S. Appl. No. 11/859,057, 10 pages.
USPTO Final Office Action, dated Mar. 23, 2010, regarding U.S. Appl. No. 11/859,057, 10 pages.
USPTO Notice of Allowance, dated Oct. 4, 2010, regarding U.S. Appl. No. 11/859,057, 9 pages.
USPTO Office Action, dated Jan. 24, 2011, regarding U.S. Appl. No. 12/398,071, 14 pages.
USPTO Final Office Action, dated Jun. 8, 2011, regarding U.S. Appl. No. 12/398,071, 9 pages.
Rubin et al., "Method for Fabricating Thermoplastic Composite Parts," U.S. Appl. No. 13/673,989 and Preliminary Amendment, filed Nov. 9, 2012, 52 pages.
European Patent Office Communication, dated Aug. 9, 2011, regarding Application No. EP08728832.0, 5 pages.
Final Office Action. dated Sep. 19, 2012, regarding U.S. Appl. No. 11/697,378, 10 pages.
Final Office Action, dated Apr. 16, 2012, regarding U.S. Appl. No. 11/584,923, 9 pages.
USPTO Office Action dated Jun. 18, 2012 regarding U.S. Appl. No. 11/697,378, 20 pages.
USPTO Office Action dated Jul. 5, 2012 regarding U.S. Appl. No. 11/701,789, 30 pages.
USPTO Notice of Allowance dated Jul. 25, 2012 regarding U.S. Appl. No. 11/584,923, 19 pages.
Final Office Action, dated Dec. 13, 2012, regarding U.S. Appl. No. 11/701,789, 9 pages.
Office Action, dated Feb. 20, 2013, regarding U.S. Appl. No. 12/398,071, 24 pages.
Office Action, dated Feb. 14, 2014, regarding U.S. Appl. No. 11/699,653, 43 pages.
Notice of Allowance, dated Nov. 20, 2013, regarding U.S. Appl. No. 12/398,071, 9 pages.
Canadian Intellectual Property Office Communication, dated Jul. 22, 2014, regarding Application No. 2,673,448, 2 pages.
Notices of Reasons for Rejection and English Translation, dated Jul. 14, 2015, regarding Japanese Patent Application No. 2012-555007, 5 pages.
Notice of allowance, dated Mar. 27, 2015, regarding U.S. Appl. No. 11/699,653, 22 pages.
Final Office Action dated Jul. 10, 2015, regarding U.S. Appl. No. 13/934,884, 17 pages.
Office Action, dated Jan. 22, 2014, regarding U.S. Appl. No. 13/673,989, 30 pages.
Final Office Action, dated Mar. 27, 2014, regarding U.S. Appl. No. 13/673,989, 12 pages.
Office Action, dated Jun. 6, 2014, regarding U.S. Appl. No. 13/673,989, 11 pages.
Final Office Action, dated Jan. 2, 2015, regarding U.S. Appl. No. 13/673,989, 19 pages.
Office Action, dated May 6, 2016, regarding U.S. Appl. No. 13/673,989, 20 pages.
Office Action, dated Jun. 25, 2015, regarding U.S. Appl. No. 14/182,215, 34 pages.
Final Office Action, dated Oct. 19, 2015, regarding U.S. Appl. No. 14/182,215, 12 pages.
Office Action, dated Jul. 18, 2014, regarding U.S. Appl. No. 13/419,187, 44 pages.
Final Office Action, dated Aug. 25, 2015, regarding U.S. Appl. No. 13/419,187, 21 pages.
Office Action, dated Mar. 4, 2016, regarding U.S. Appl. No. 14/602,699, 48 pages.
Final Office Action, dated Aug. 8, 2016, regarding U.S. Appl. No. 14/602,699, 17 pages.
Notice of Allowance, dated Jul. 7, 2016, regarding U.S. Appl. No. 13/673,989, 9 pages.
Notice of Allowance, dated Sep. 8, 2016, regarding U.S. Appl. No. 14/182,215, 15 pages.
Office Action, dated Nov. 21, 2016, regarding U.S. Appl. No. 13/419,187, 31 pages.
Office Action, dated Dec. 29, 2016, regarding U.S. Appl. No. 14/602,699, 18 pages.
Final Office Action, dated Jun. 8, 2017, regarding U.S. Appl. No. 14/602,699, 20 pages.
Canadian Intellectual Property Office Communication, dated Apr. 4, 2017, regarding Application No. 2,790,614, 3 pages.
Office Action, dated Nov. 22, 2017, regarding U.S. Appl. No. 13/419,187, 13 pages.
Office Action, dated Oct. 2, 2017, regarding U.S. Appl. No. 14/538,977, 14 pages.
Office Action, dated Jan. 26, 2018, regarding U.S. Appl. No. 14/602,699, 26 pages.
Final Office Action, dated Mar. 15, 2018, regarding U.S. Appl. No. 13/419,187, 26 pages.

* cited by examiner

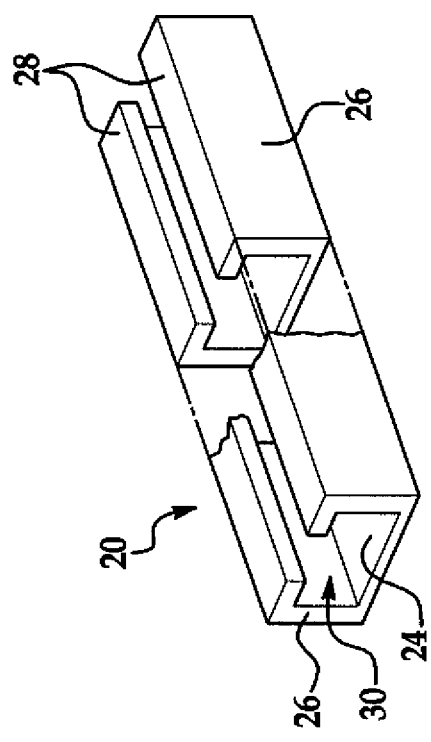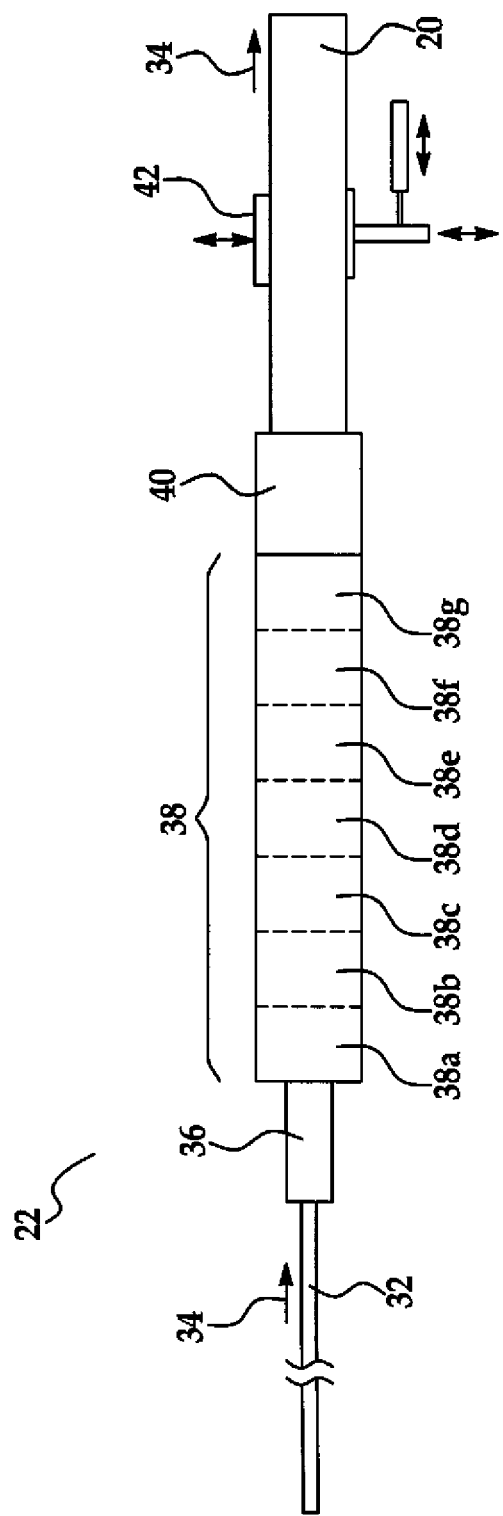

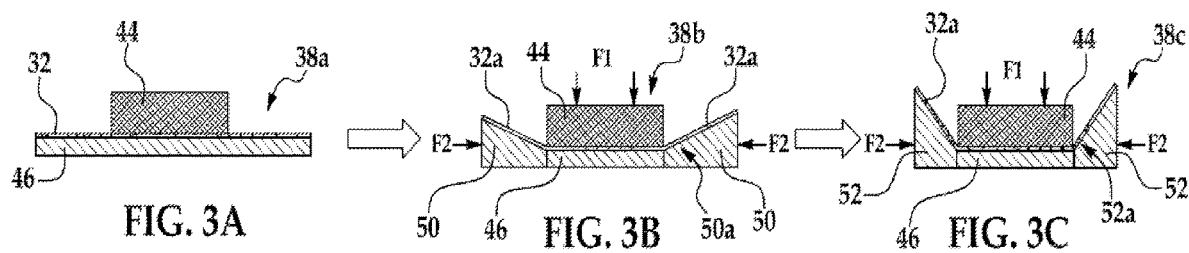
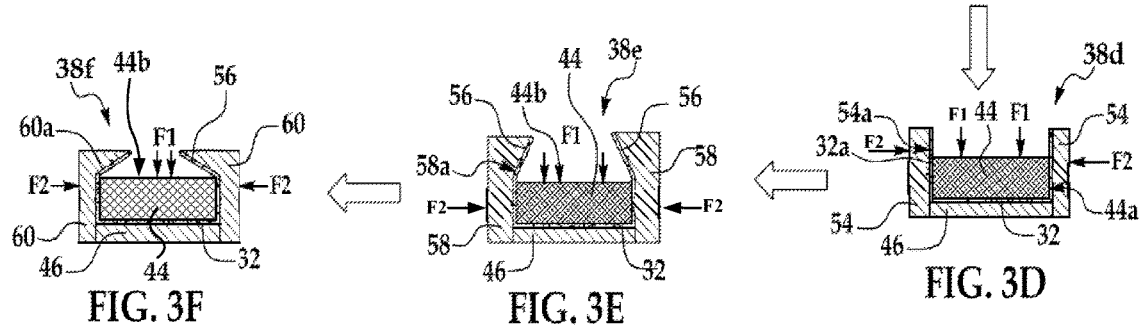
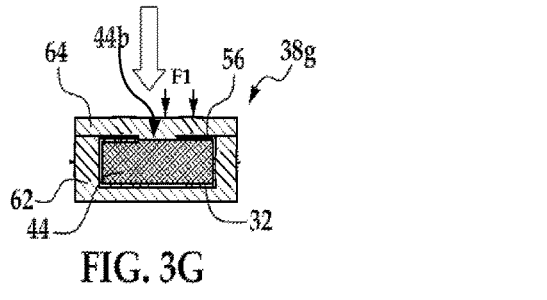
FIG. 3G
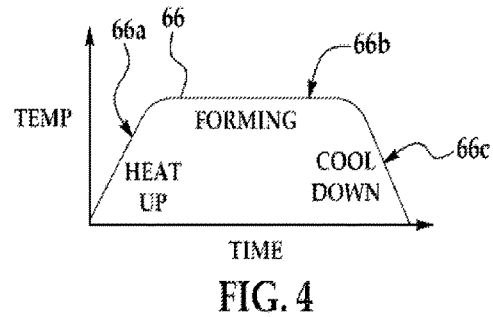
FIG. 4

CONTINUOUS MOLDING OF THERMOPLASTIC LAMINATES

CROSS REFERENCE TO RELATED APPLICATIONS

This application is related to co-pending U.S. patent application Ser. No. 11/347,122 filed Feb. 2, 2006, now U.S. Pat. No. 7,807,005, issued Oct. 5, 2010; Ser. No. 11/584,923 filed Oct. 20, 2006; Ser. No. 11/699,653 filed Jan. 29, 2007; Ser. No. 11/701,789 filed Feb. 3, 2007; 11/697,378 filed Apr. 6, 2007; and Ser. No. 11/859,057 filed Sep. 21, 2007, now U.S. Pat. No. 7,871,553, issued Jan. 18, 2011, all of which are incorporated by reference herein in their entireties.

TECHNICAL FIELD

This disclosure generally relates to processes for fabricating thermoplastic composite parts, and deals more particularly with a method of continuously molding features into a length of a pre-consolidated thermoplastic laminate, especially features that form a substantially closed cross sectional shape.

BACKGROUND

Various processes exist for fabricating thermoplastic composite (TPC) laminates. An addition to non-continuous processes such as pressing, stamping and autoclave forming, there are continuous processes such as extrusion, pultrusion, roll forming and compression molding. More recently, processes have been developed for producing TPC parts in continuous lengths using a continuous compression molding process. The pultrusion process may have limitations on fiber orientations that may preclude optimal use of composite materials for strength and weight savings. Press forming and autoclave consolidation processes may not easily produce parts that have closed cross section shapes, and may be more costly at higher production rates.

Accordingly, there is a need for a method of fabricating composite parts that allows post-forming continuous lengths of a pre-consolidated TPC laminate while maintaining favorable structural properties of the pre-consolidated laminate. There is also a need for a method of forming TPC laminate parts that have substantially closed cross sectional shapes, and which is not limited to length of the part or ply layup configuration.

SUMMARY

The disclosed embodiments provide a method of fabricating TPC parts in which a pre-consolidated laminate is post formed into the desired part shape under controlled heat and pressure using a continuous post forming process. The continuous post forming process allows the specified and/or favorable performance and/or structural properties of the pre-consolidated laminate to be retained after the laminate is compression molded into the desired part shape. The disclosed method allows pre-consolidated laminates of any ply orientation or configuration to be continuously formed without limitations on part length. The method allows production of parts having substantially closed cross sections and/or curvature along their length. The processing method is suited for use with automated processes and controls that may result in efficient, low cost, high rate production.

According to one disclosed embodiment, a method is provided of fabricating a composite part. The method includes producing a pre-consolidated TPC laminate and feeding the pre-consolidated laminate substantially continuously through a forming zone. The pre-consolidated laminate is heated to a temperature sufficient to allow forming of the laminate but below the melting point of the laminate. One or more features are incrementally formed into the heated laminate as the laminate is being fed through the forming zone. Producing the pre-consolidated TPC laminate may include forming a layup of multiple plies of a reinforced thermoplastic, molding at least one shape into the layup, and then consolidating the shaped layup. Incremental forming of the heated laminate may be performed using a set of tool dies to respectively mold portions of the feature into the laminate. Forming features into the laminate may include forming portions of the heated laminate over a mandrel.

According to another embodiment, a method is provided of fabricating a composite part comprising laying up a multi-ply TPC laminate and consolidating the laminate layup. The consolidated laminate is heated to a pre-selected temperature that is below its melting point but sufficient to soften the laminate for molding. The heated, consolidated laminate is fed substantially continuously through multiple sets of tool dies which collectively mold at least one feature into the laminate as the laminate is being fed through the tool dies. Each of the tool dies is used to partially mold a portion of the feature into the heated laminate. The method further comprises cooling the laminate after the feature has been molded therein and curing the molded laminate. The method may also comprise using the tool dies to mold a curvature into the laminate along its length. Feeding the laminate includes limiting the time during which the laminate is heated to the preselected temperature for a period that results in maintenance of the structural properties of the consolidated laminate prior to being heated.

According to still another disclosed embodiment, a continuous compression molding method is provided for producing an elongate part having a closed cross section. The method comprises feeding a pre-consolidated TPC laminate substantially continuously through a compression molding machine. The laminate is softened by heating it to a temperature that is below its melting point. The method includes molding portions of features into the softened laminate sequentially using differing tool dies in the machine as the laminate is being fed through the machine. Molding of the laminate includes forming portions of the heated laminate around a mandrel to at least partially close the cross section of the molded part. Feeding the pre-consolidated laminate substantially continuously through the compression molding machine may be performed along a curved path.

The disclosed embodiments satisfy the need for a method of fabricating continuous lengths of a composite part having any of various cross sectional shapes, including closed shapes using continuous molding of pre-consolidated laminates without compromising structural properties of the pre-consolidated laminate during the molding process.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIG. 1 is an illustration of a perspective view of a typical TPC part fabricated by the disclosed method.

FIG. 2 is an illustration of a diagrammatic view showing a post forming machine suitable for forming continuous lengths of the TPC part shown in FIG. 1.

FIGS. 3A-3G are sectional views sequentially showing incremental molding of the part of FIG. 1 using the machine illustrated in FIG. 2.

FIG. 4 is an illustration of a temperature profile of the TPC laminate during the molding process.

DETAILED DESCRIPTION

Figure 5:
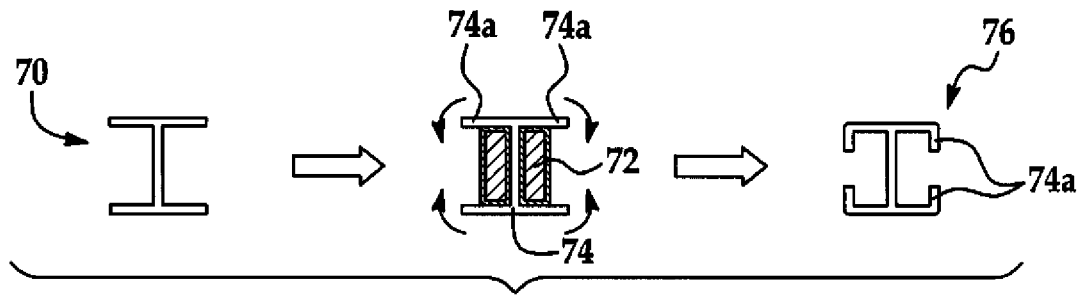
FIGS. 5-8 are illustrations respectively showing how pre-shaped, pre-consolidated TPC laminates may be formed into parts having various features using the disclosed method.

The disclosed embodiments provide a method of fabricating a TPC part in a continuous process. The method may be employed to fabricate TPC parts useful in a wide range of applications including, without limitation, an aircraft. The parts may be used in various industries for a wide range of structural and non-structural applications. In the aircraft industry, the method may be used to produce parts such as keel beams, floor beams, deck beams, reinforcements, fuselage framework and stiffeners, to name only a few. Thus, as used herein, "part" and "parts" refer to a wide range of composite members and structures which may or may not be used to provide structural reinforcement or stiffening. As will be discussed below in more detail, the parts may be made in continuous lengths and may be either straight or have one or more curvatures along their lengths.

Referring now to FIGS. 1 and 2, a part 20 comprising a thermoplastic composite may be fabricated in continuous lengths according to the disclosed method using a post forming machine 22. In this example, the part 20 includes a bottom wall 24 and side walls 26 forming a substantially U-shaped cross section. A pair of inwardly turned caps 28 on the sidewalls 26 result in a substantially closed cross sectional shape having a conduit-like cavity 30 along the length of the part 20. As used herein, "closed cross section" and "substantially closed cross section" refer to a cross sectional shape of the part 20 that is at least partially closed around its periphery and/or which may normally prevent the withdrawal of tooling (not shown) from the cavity 30 using conventional molding techniques. While the part 20 illustrated in FIG. 1 has a generally rectangular cross section, a variety of other cross sectional shapes are possible, as will be discussed later in more detail.

Referring particularly to FIG. 2, a substantially flat, or partially formed, straight, TPC, and pre-consolidated laminate 32 is fed linearly in the direction of the arrow 34 through the post forming machine 22 which forms one or more features into the laminate 32 along its length in order to form the part 20. "Post forming" refers to the fact that the laminate 32 is formed into shapes after it has been consolidated and in some cases, after it has also been pre-shaped. In the case of the part 20 illustrated in FIG. 1, the features formed by the post forming machine 22 include sidewalls 26 and caps 28. The post forming machine 22 broadly includes a heating zone 36, a forming zone 38 which may also be heated, a cooling zone 40 which may form part of the forming zone 38 in some embodiments, and a pulsating mechanism 42.

The laminate 32 is formed of individual plies (not shown) comprising a suitable thermoplastic polymer resin matrix such as, without limitation, polyetheretherketone ("PEEK"), polyetherketoneketone ("PEKK"), polyphenylsulfone ("PPS"), polyetherimide ("PEI"), which may be reinforced with a fibrous component such as glass (s-type or e-type) or carbon fiber (not shown). The reinforcing fibers within each ply may be oriented in a unidirectional or non-uniform arrangement, depending upon the particular application. The relative types, thicknesses, amounts of fibers within the polymer matrix, as well as the type of polymer matrix utilized in each ply may vary widely, based on numerous factors, including cost and the ultimate desired physical and mechanical properties of the part 20.

The laminate 32 may be pre-consolidated using any of various processes, including, but not limited to, conventional vacuum bagging, autoclave processing or compression molding in a machine such as that disclosed in U.S. patent application Ser. No. 11/347,122 filed Feb. 2, 2006 which is incorporated by reference herein. In the compression molding machine described in the US Patent Application mentioned immediately above, a flat layup stack (not shown) or a preformed part (not shown) is fed through a consolidation zone in the machine where it is heated to the melting point of the thermoplastic matrix and is compressed using dies to form a consolidated, integrated thermoplastic composite laminate which may then be formed into a variety of shapes within the machine.

The pulsating mechanism 42 of the post forming machine 22 incrementally moves the laminate 32 substantially continuously in a step-wise manner through the forming zone 38 which includes a series of tool dies 38a-38g, some of which include left and right die halves that have a progressive shape. These die halves may also wrap over the top of the laminate 32 being formed near the end of the forming zone 38. In lieu of the pulsating mechanism 42, other types of mechanisms may be used for moving the laminate 32 along in a similar manner. As will be discussed later in more detail, each of the tool dies 38a-38g molds at least a portion of a feature into the laminate 32. Also, it should be noted here that the tool dies 38a-38g may not be separate from each other, but rather may comprise a single die that has multiple separate die shapes formed therein, so that with each compression of the laminate 32 by this single die, multiple differing portions of the desired shape are formed.

Pressure is applied to both the laminate 32 and to the parts of the tool dies 38a-38g in order to compress the laminate 32 in one, independent yet coordinated motion. Following a compression in which portions of a feature are molded into the laminate 32, the tool dies 38a-38g are opened simultaneously and the laminate 32 is advanced a step by the pulsating mechanism 42 following which, the tool dies 38a-38g are simultaneously closed again, compressing the laminate 32 to form another portion (i.e. a linear section) of the feature.

A heating device (not shown) in the heating zone 36 heats the laminate 32 to a pre-selected temperature that is sufficiently high to cause softening of the laminate 32 so that it may be subsequently formed, but which is below the temperature at which the polymeric component of the laminate 32 exceeds its melting point. The heating zone 36 may include any of various devices suitable for heating the laminate 32, including but not limited to an oven (not shown) or infrared heat lamps (not shown). Following molding of one or more features into the laminate 32 in the forming zone 38, the laminate 32 is cooled as is passes through the cooling zone 40 which may include, without limitation, active cooling of the tooling that contacts the laminate 32 or fans or blowers which pass ambient or chilled air over the part 20 as it exits the forming zone 38.

Attention is now directed to FIGS. 3A-3G which illustrate the sequence in which the cooperating portions of the tool dies 38a-38g incrementally form the laminate 32 into the part 20 shown in FIG. 1. Beginning with FIG. 3A, the laminate 32 passes through the first set of tool die 38a which comprises a tool base 46 and a rectangular tool block, also referred to herein as a mandrel 44. Specifically, the laminate 32 passes between the tool base 46 and the mandrel 44 as it is advanced by the pulsating mechanism 42.

FIG. 3B illustrates the laminate 32 having progressed into the next set of tool dies 38b comprising mandrel 44, base 46 and a pair of opposing, laterally movable lateral tool die halves 50. Downward pressure applied to the mandrel 44, as indicated by arrows F1, forces the laminate 32 against the tool base 46, while the lateral tool die halves 50 are forced inwardly against the laminate 32 as shown by the arrows F2. The lateral tool die halves 50 have inclined tool surfaces 50a which compress lateral portions 32a of the laminate 32, thereby partially forming the laminate 32. Similarly, the next set of tool dies 38c shown in FIG. 3C comprises mandrel 44, tool base 46 and a pair of lateral tool die halves 52 having inclined tool surfaces 52a that compress and further form the lateral portions 32a of the laminate 32.

As the laminate 32 continues to move in the substantially continuous step-wise fashion through the forming zone 38 it passes through the next set of tool dies 38d comprising mandrel 44, tool base 46 and a pair of lateral tool die halves 54. The lateral tool die halves 54 include tool surfaces 54a that are configured to compress lateral portions 32a of the laminate 32 against the sides 44a of the mandrel 44, thereby completing the formation of the sidewalls 26 (FIG. 1) of the part 20.

The next set of tool dies 38e shown in FIG. 3E comprises the mandrel 44, tool base 46 and another pair of lateral tool die halves 58 that include tool surfaces 58a which compress and partially form the lateral ends 56 of the laminate 32, inwardly toward each other, and partially over the top wall 44b of the mandrel 44. The next set of tool dies 38f shown in FIG. 3F is similar to that shown in FIG. 3E except that the lateral tool die halves 60 have tool surfaces 60a that further partially form the lateral ends 56 of the laminate 32 down over the top wall 44b of the mandrel 44.

Finally, as shown in FIG. 3G, the laminate 32 enters the final set of tool dies 38g which comprises mandrel 44, a generally U-shaped, lower tool die 62, and a substantially flat, upper tool die 64. The upper die 64 moves downwardly, as shown by the arrows F1, thereby compressing and forming the lateral ends 56 of the laminate 32 onto the top surface 44b of the mandrel 44, thus forming the caps 28 (FIG. 1) of the part 20.

As previously mentioned, the laminate 32 is heated to a forming temperature in the heating zone 36 prior to entering the forming zone 38. In some embodiments, one or more sets of the tool dies 38a-38g may be heated in order to maintain the temperature of the laminate 32 sufficiently high so that the laminate 32 remains soft enough to form by compression molding, but still below the melting point of the laminate 32.

FIG. 4 graphically illustrates a typical temperature profile 66 of the laminate 32 as a function of time, which also corresponds to the position of the laminate 32 as it moves through the post forming machine 22. The temperature of the laminate 32 is initially ramped up at 66a before reaching and being held at a preselected forming temperature 66b. The laminate 32 remains at the forming temperature 66b as it progresses through the sets of tool dies 38a-38g. The laminate 32 is then subjected to a cool down ramp 66c which may be controlled by the amount of cooling effected within the cooling zone 40 and the rate at which the laminate 32 passes through the cooling zone 40. Again, as previously mentioned, the section of the laminate 32 disposed within the forming zone 38 is maintained substantially at the preselected forming temperature 66b during compression molding. By maintaining the temperature of the laminate 32 below its melting point throughout the molding process, including temperature ramp-up and cool down, favorable performance and/or structural properties of the pre-consolidated laminate 32 are maintained, and are therefore exhibited by the part 20.

In the case of the part shown in FIG. 1 and FIGS. 3A-3G, forming of the part 20 begins with a substantially flat, pre-consolidated laminate 32. Depending upon the final shape and features of the part 20, it may be necessary or desirable to use a laminate that has been pre-shaped along its length as the reinforced TPC plies are being laid up and/or pre-consolidated. For example, as shown in FIG. 5, a pre-consolidated laminate 70 is pre-shaped in the form of a generally I-shaped cross section. A combination of tool dies (not shown) and forming blocks or mandrels 72 may then be used to form the extremities 74a of each cap 74 down over mandrels 72, resulting in the substantially closed cross sectional shape indicated by reference numeral 76.

Figure 6:
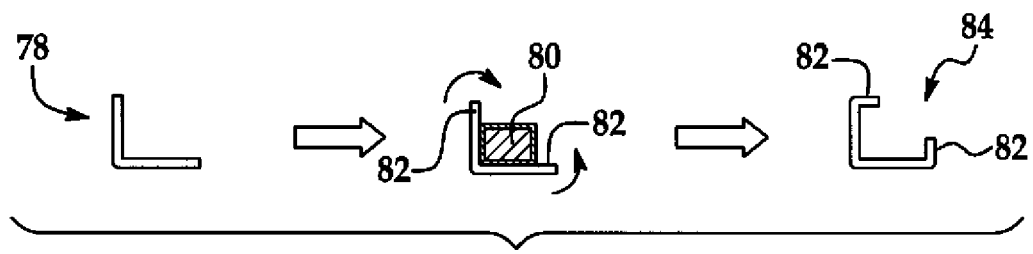

FIG. 6 shows the use of a pre-consolidated, pre-shaped laminate 78 having an "L" cross section that may be formed by the post forming process previously described to produce a substantially closed cross sectional shape 84 by forming the extremities 82 of the laminate 78 down over a mandrel 80.

Figure 7:
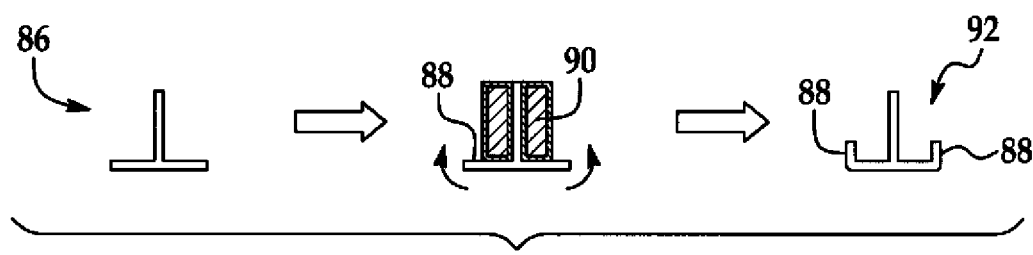

FIG. 7 illustrates a pre-consolidated laminate 86 that has been pre-shaped into an inverted "T" cross section. The laminate 86 is molded into partially closed cross section shape 92 in which the extremities 88 of the laminate 86 have been formed over mandrels 90 to produce the partially closed cross section shape 92.

Figure 8:
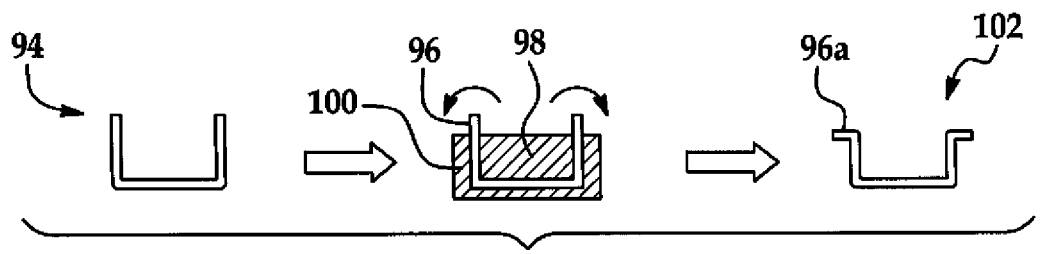

FIG. 8 illustrates still another pre-consolidated laminate 94 that has been pre-shaped into a substantially "U" cross section. A mandrel 98 and tool dies 100 are used in combination with additional tool dies (not shown) during the disclosed post forming process to form the extremities 96 of the laminate 94 outwardly and down over the tool die 100, thereby forming a modified U-shape 102 having outwardly turned flanges 96a.

FIGS. 5-8 illustrate only a few examples of pre-shaped, pre-consolidated laminates that may be reshaped according to the disclosed embodiments, and thus should not be construed as limiting. Reshaping of other pre-shaped pre-consolidated laminates is possible. For example, and without limitation, a pre-consolidated laminate having an "L" or "U" cross section (not shown) may be reshaped into a cross section (not shown), and a pre-consolidated laminate having a "T" cross section (not shown) may be reshaped into a "J" cross section (not shown).

Figure 9:
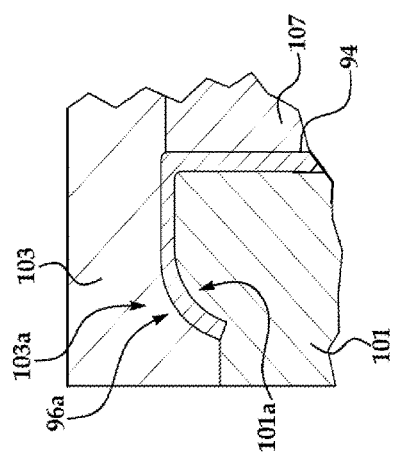
FIG. 9 is an illustration of a fragmentary, sectional view showing how tool dies may be used to form curved features into the cross section of the TPC laminate.

The examples previously described illustrate techniques in which parts of the laminate are formed over substantially flat tool die surfaces. However, as shown in FIG. 9, tool dies 101, 103 may include curved surfaces 101a, 103a respectively, which may be used, in combination with a mandrel 107 to form curved features in a laminate 94, such as the downwardly curved flanges 96a.

Figure 10:
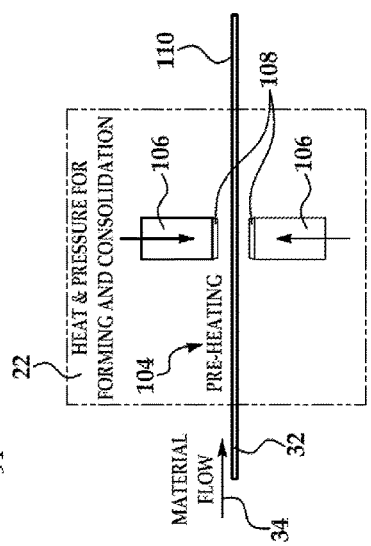
FIG. 10 is an illustration of a diagram showing the use of opposing dies for molding continuous lengths of a straight part.

Attention is now directed to FIG. 10 which diagrammatically illustrates parts of the post forming machine 22 in which a pre-consolidated laminate 32 is preheated at 104 to soften the laminate 32 prior to being formed by one or more sets of tool dies 108. The tool dies 108 are mounted on press elements 106 which compress the tool dies 108 against the laminate 32, in order to form laminate 32 into a finished part 110. In this example, the laminate 32 moves along a substantially straight path 34 and the tool dies 108 have substantially flat profiles, consistent with the straight line path of advancement of the laminate 32 through the post forming machine 22.

Figure 11:
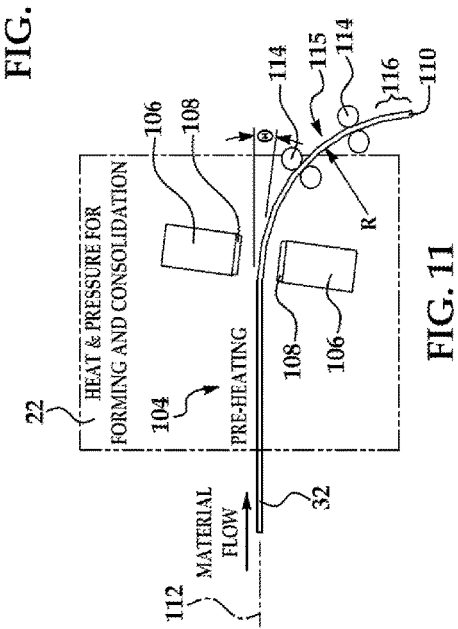
FIG. 11 is an illustration similar to FIG. 10 but showing molding of a TPC laminate in segments along a curved path using flat tool dies.

In other embodiments, the pre-consolidated laminate may be formed into a part having curvature along its length. For example, referring to FIG. 11, a substantially straight, pre-consolidated laminate 32 may be fed through one or more sets of tool dies 108 which may be substantially straight in profile but positioned at an angle θ relative to the axis 112 along which the laminate 32 is fed though the post forming machine 22. As a result of this arrangement, the tool dies 108 form a series of substantially straight sections 116 of the laminate 32 which are slightly angled relative to each other to produce a part 110 that is substantially curved, piece-wise along its length. The part 110 may be fed through a series of guides 114 along a curved path 115 having a radius of curvature "R".

Figure 12:
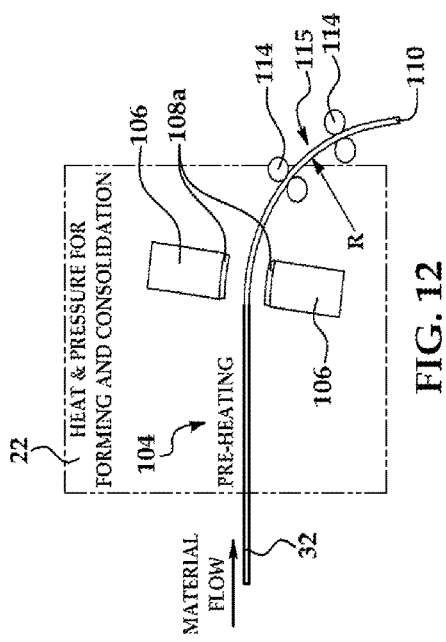
FIG. 12 is an illustration similar to FIG. 11 but showing molding of a TPC laminate along a curved path using curved tool dies.

FIG. 12 illustrates another embodiment for continuous compression molding of a laminate 32 to produce a part 110 having curvature 115 along its length. In this example, tool dies 108a possess curved profiles which are transferred to the laminate 32 during molding in order to form a part 110 that has a substantially continuous curvature with a radius of curvature "R", in contrast to the substantially straight sections 116 in the part 110, shown in FIG. 11.

Figure 13:
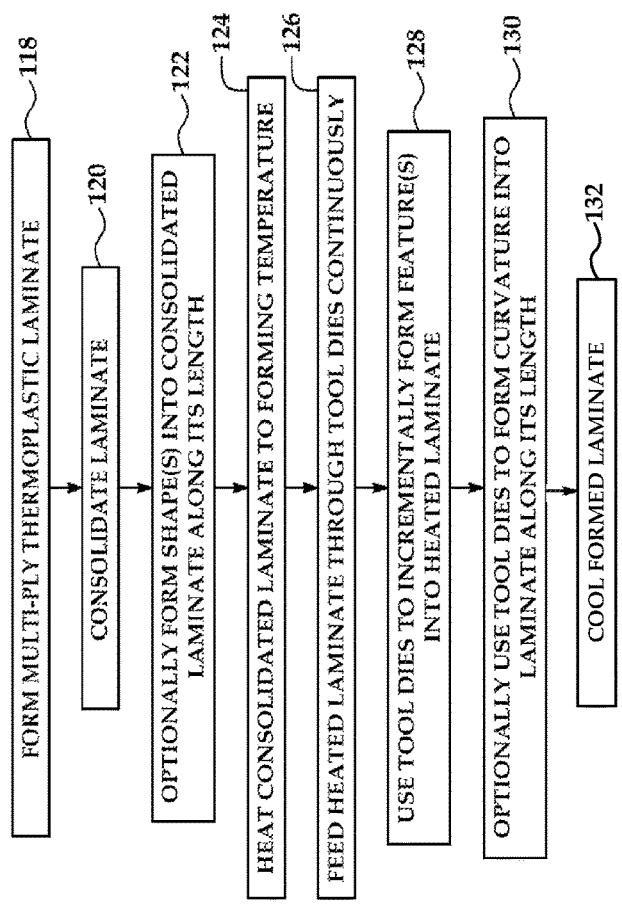
FIG. 13 is an illustration of a flow diagram of a method of fabricating a TPC part using continuous compression molding of a pre-consolidated laminate.

Attention is now directed to FIG. 13 which illustrates the steps of a method of continuous molding of thermoplastic laminates. Beginning at 118, a multi-ply TPC laminate is formed. The laminate is then pre-consolidated at step 120 using any of various techniques as previously described, including vacuum bagging or continuous compression molding processes. At 122, shapes may be formed into the consolidated laminate along its length using forming tools during layup or tool dies in a CCM machine (not shown) that is used to consolidate and shape the laminate. Forming of the shapes in step 122 may be performed as part of the pre-consolidation step 120. Next, at 124, the consolidated laminate is heated to a forming temperature that is below the melting point of the laminate in order to soften the laminate in preparation for forming. At 126, the heated laminate is fed substantially continuously through one or more sets of tool dies. As shown at 128, the tool dies are used to incrementally form features into the heated laminate as the laminate is being fed through the tool dies. Optionally, at step 130, the tool dies may be used to form a curvature into the laminate along its length. Following the forming process, the laminate is cooled down at 132.

Figure 14:
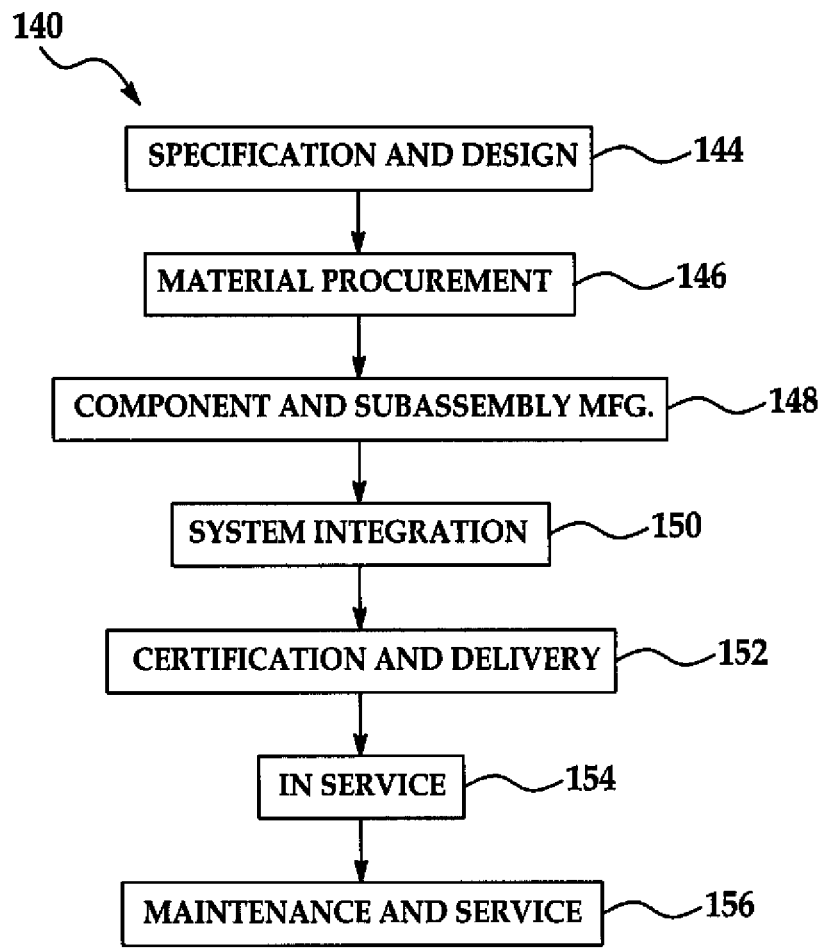
FIG. 14 is a flow diagram of aircraft production and service methodology.
Figure 15:
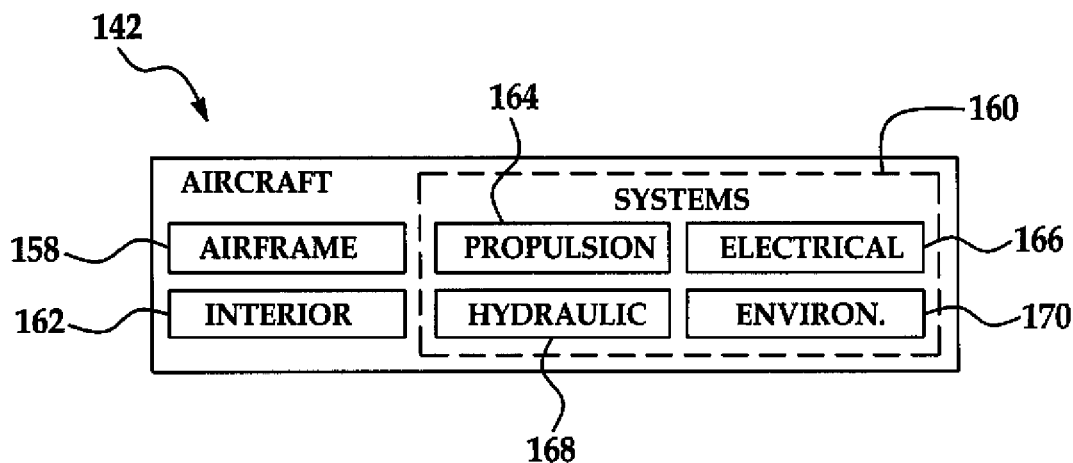
FIG. 15 is a block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 140 as shown in FIG. 14 and an aircraft 142 as shown in FIG. 15. Aircraft applications of the disclosed embodiments may include, for example, without limitation, composite stiffened members such as beams, stiffeners, supports, control surfaces, hatches, floor panels, door panels, access panels and empennages, to name only a few. During pre-production, exemplary method 140 may include specification and design 144 of the aircraft 142 and material procurement 146. During production, component and subassembly manufacturing 148 and system integration 150 of the aircraft 142 takes place. Thereafter, the aircraft 142 may go through certification and delivery 152 in order to be placed in service 154. While in service by a customer, the aircraft 142 is scheduled for routine maintenance and service 156 (which may also include modification, reconfiguration, refurbishment, and so on).

Each of the processes of method 140 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 142 produced by exemplary method 140 may include an airframe 158 with a plurality of systems 160 and an interior 162. The TPC parts produced by the disclosed method may be used in the airframe 158 or in the interior 162. Examples of high-level systems 160 include one or more of a propulsion system 164, an electrical system 166, a hydraulic system 168, and an environmental system 170. Any number of other systems may be included. Although an aerospace example is shown, the principles of the disclosure may be applied to other industries, such as the marine and automotive industries.

Systems and methods embodied herein may be employed during any one or more of the stages of the production and service method 140. For example, TPC components or subassemblies corresponding to production process 148 may be fabricated or manufactured in a manner similar to components or subassemblies produced while the aircraft 142 is in service. Also, one or more method embodiments may be utilized during the production stages 148 and 150, for example, by substantially expediting assembly of or reducing the cost of an aircraft 142. Similarly, one or more method embodiments may be utilized to produce TPC parts that installed while the aircraft 142 is in service, or during maintenance and service 156.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite part, comprising:
placing a laminate on a tool base, the laminate comprising a pre-consolidated, integrated thermoplastic composite laminate;
substantially continuously feeding the laminate between a mandrel and the tool base and through a forming zone comprising a linear series of a plurality of sets of tool dies, wherein each set of tool dies comprises a pair of opposing, laterally movable die halves, wherein each pair of die halves has a progressively different shape relative to other pairs of die halves in other sets of tool dies of the plurality of tool dies;
heating the laminate to a temperature sufficient to allow forming of the laminate but below a melting temperature of the laminate, wherein a heated laminate is formed; and
incrementally forming features into sections of the heated laminate as the heated laminate is being fed through the forming zone, and wherein incrementally forming features into sections is further performed by laterally moving, with respect to the mandrel and the tool base, the pairs of die halves of the plurality of tool dies to compress lateral portions of the heated laminate, thereby respectively molding portions of the features into the heated laminate by shapes of plurality of sets of tool dies sequentially forcing a same portion of the heated laminate to incrementally fold over the mandrel as the heated laminate passes sequentially through the plurality of tool dies of the forming section, wherein a contoured laminate is formed.

2. The method of claim 1, further comprising:
cooling the contoured laminate at a temperature and rate configured to maintain structural properties, after the features have been formed.

3. The method of claim 2, wherein:
heating the pre-consolidated laminate is performed a section at a time and wherein the temperature and rate of heating are configured to maintain structural properties; and
cooling the contoured laminate is performed a section at a time.

4. The method of claim 1, wherein each set of tool dies in the plurality of sets of tool dies incrementally molds the heated laminate to form the features.

5. The method of claim 1, wherein feeding the pre-consolidated laminate substantially continuously through the forming zone is performed along a curved path.

6. The method of claim 1, wherein incrementally forming the features into the heated laminate includes molding a curvature into the heated laminate along its length.

7. The method of claim 1, wherein the heated laminate comprises a substantially non-planar cross section.

8. The method of claim 1, wherein the contoured laminate comprises a substantially closed cross sectional shape.

9. The method of claim 1, wherein the mandrel comprises a rectangular bar.

10. A method of fabricating a composite part, comprising:
laying up a laminate, the laminate comprising multiple plies of thermoplastic material;
consolidating entirety of the laminate to form a pre-consolidated laminate;
placing the pre-consolidated laminate on a tooling surface;
heating the pre-consolidated laminate to form a heated laminate, wherein the pre-consolidated laminate is heated to a preselected temperature below its melting point but sufficient to soften the pre-consolidated laminate for molding, wherein the heated laminate is formed;
substantially continuously feeding the heated laminate between a mandrel and the tooling surface and through a forming zone comprising a plurality of sets of tool dies in a continuous compression molding machine, wherein different ones of the plurality of sets of tool dies comprises a pair of opposing, laterally movable die halves, wherein each pair of die halves have progressively different shapes relative to other pairs of die halves in other sets of tool dies of the plurality of tool dies; and
using the plurality of sets of tool dies to incrementally mold features into sections of the heated laminate as the heated laminate is being fed through the forming zone by laterally moving, with respect to the mandrel and the tool base, the pairs of die halves of the plurality of sets of tool dies to compress lateral portions of the heated laminate, thereby respectively molding portions of the features into the heated laminate, and also including different ones of the plurality of sets of tool dies sequentially forcing a same portion of the heated laminate to incrementally fold over the mandrel as the heated laminate passes sequentially through the plurality of tool dies of the forming section, wherein a contoured laminate is formed.

11. The method of claim 10, further comprising:
cooling the contoured laminate at a temperature and rate configured to maintain structural properties after the features have been formed; and
curing the contoured laminate.

12. The method of claim 11, wherein:
heating the pre-consolidated laminate is performed a section at a time, heating the pre-consolidated laminate includes limiting a time each section of the pre-consolidated laminate is heated to maintain structural properties of the pre-consolidated laminate; and
cooling the contoured laminate is performed a section at a time.

13. The method of claim 10, wherein:
using the plurality of sets of tool dies further includes maintaining the heated laminate at the preselected temperature while the heated laminate is formed over the mandrel.

14. The method of claim 10, wherein molding the features includes forming the heated laminate into a substantially closed cross sectional shape.

15. The method of claim 10, wherein the pre-consolidated laminate comprises a substantially non-planar cross section.

16. The method of claim 10, wherein the consolidating step is performed through vacuum bagging, autoclave processing or compression molding.

17. A method for continuously producing an elongate part, comprising:
feeding a laminate substantially continuously through a forming zone of a continuous compression molding machine, the laminate comprising a pre-consolidated, integrated thermoplastic composite material, the forming zone comprising a plurality of tool dies, wherein each set of tool dies comprises a pair of opposing, laterally movable die halves, wherein each pair of die halves has a progressively different shape relative to other pairs of die halves in other sets of tool dies of the plurality of tool dies;
softening the laminate by heating the laminate to a temperature below its melting point; and molding cross sectional features into the laminate sequentially by laterally moving, with respect to the mandrel and the tool base, the pairs of die halves of the plurality of sets of tool dies in the continuous compression molding machine to compress lateral portions of the heated laminate being fed substantially continuously through internal portions of the plurality of tool dies of the forming zone of the continuous compression molding machine, including molding portions of the heated laminate by sequentially forcing a same portion of the heated laminate to incrementally fold around a mandrel to at least partially close the cross section of the heated laminate as the heated laminate passes sequentially through the plurality of tool dies of the forming section, wherein molding cross sectional features into the heated laminate forms a contoured laminate.

18. The method of claim 17, further comprising:
cooling the contoured laminate at a temperature and rate configured to maintain structural properties, after the cross sectional features have been formed.

19. The method of claim 17, wherein feeding the laminate substantially continuously through the forming zone of the continuous compression molding machine is performed along a curved path.

20. The method of claim 17, wherein molding cross sectional features into the heated laminate includes molding a curvature into the heated laminate along its length.

21. A method of fabricating an elongate composite part having a substantially closed cross sectional shape, comprising:
feeding a heated laminate substantially continuously through a plurality of sets of tool dies comprising a forming zone, wherein each set of tool dies comprises a pair of opposing, laterally movable die halves, wherein each pair of die halves has a progressively different shape relative to other pairs of die halves in other sets of tool dies of the plurality of tool dies; and
laterally moving, with respect to the mandrel and the tool base, the pairs of die halves of the plurality of sets of tool dies to incrementally fold the heated laminate over a mandrel as the heated laminate passes through the forming section to form the substantially closed cross sectional shape as the heated laminate is fed substantially continuously through the plurality of sets of tool dies, wherein different ones of the pairs of die halves of the plurality of sets of tool dies compress lateral portions of the heated laminate, thereby incrementally molding features into the heated laminate by sequentially forcing a same portion of the heated laminate to incrementally fold over the mandrel, wherein incrementally molding features comprises opening the plurality of sets of tool dies simultaneously and closing the plurality of sets of tools dies simultaneously, wherein a contoured laminate is formed.

* * * * *